UNITED STATES PATENT OFFICE.

LEE HOFFMAN STODDER, OF NEW YORK, N. Y.

PROCESS OF RENDERING TEXTILE PNEUMATIC TIRES PUNCTURE-PROOF.

SPECIFICATION forming part of Letters Patent No. 586,926, dated July 20, 1897.

Application filed October 28, 1896. Serial No. 610,318. (No specimens.)

*To all whom it may concern:*

Be it known that I, LEE HOFFMAN STODDER, a citizen of the United States, residing at New York, in the county of New York and State of New York, have invented certain new and useful Improvements in the Process of Rendering Textile Pneumatic Tires Puncture-Proof, of which the following is a specification.

This invention relates to improvements in the process of rendering pneumatic tires puncture-proof, the process consisting in treating the fabric or material which forms a part of the tire to render it puncture-proof and, incidentally, impervious to moisture.

To accomplish the objects of my invention I first make a solution of five gallons of water and two pounds of unslaked lime, and when the lime is thoroughly mixed and incorporated in the water I immerse the tire material therein and let it remain in the alkaline solution for five or more hours, when the material is removed and thoroughly dried either by atmospheric exposure or by other suitable process.

The quantity of lime solution above named is that intended for the treatment of about fifty yards of the tire material. This alkaline treatment prepares the material for the subsequent indurating sandarac coating. The alkaline solution thoroughly saturates the fabric and fills the meshes thereof, making it less liable to puncture and presenting a proper surface to prevent absorption of the sandarac solution subsequently applied, yet leaving the material sufficiently soft and pliable for working into shape.

When the tire material has been completely dried, I take a solution made of five gallons of alcohol and two and a half pounds of gum sandarac and pass the tire material quickly through it and then dry the tire material, and when dry it is ready for use. This treatment, it will be found, makes the fabric of the tire puncture-proof against all the ordinary obstacles encountered in the path of the wheel and also impervious to moisture.

What I claim is—

The process herein described for rendering the textile material in a pneumatic tire puncture-proof, consisting in immersing the textile material in a solution of water and lime, then removing the material from the solution and drying it with the alkaline solution incorporated therein; then quickly passing the dried material through a solution of alcohol and gum-sandarac, and then drying the material.

In testimony whereof I affix my signature in presence of two witnesses.

LEE HOFFMAN STODDER.

Witnesses:
HORACE D. LISSER,
JAMES A. JACOBS.